US012561843B2

(12) United States Patent
Almehio et al.

(10) Patent No.: US 12,561,843 B2
(45) Date of Patent: Feb. 24, 2026

(54) METHOD FOR MANAGING IMAGE DATA, AND VEHICLE LIGHTING SYSTEM

(71) Applicant: VALEO VISION, Bobigny (FR)

(72) Inventors: Yasser Almehio, Bobigny (FR); Hafid El Idrissi, Bobigny (FR); Constantin Prat, Bobigny (FR)

(73) Assignee: Valeo Vision, Bobigny (FR)

( * ) Notice: Subject to any disclaimer, the term of this patent is extended or adjusted under 35 U.S.C. 154(b) by 589 days.

(21) Appl. No.: 17/919,905

(22) PCT Filed: Apr. 22, 2021

(86) PCT No.: PCT/EP2021/060609
§ 371 (c)(1),
(2) Date: Oct. 19, 2022

(87) PCT Pub. No.: WO2021/214263
PCT Pub. Date: Oct. 28, 2021

(65) Prior Publication Data
US 2023/0177731 A1 Jun. 8, 2023

(30) Foreign Application Priority Data

Apr. 24, 2020 (FR) ...................................... 2004135

(51) Int. Cl.
*G06T 9/00* (2006.01)
*B60Q 1/00* (2006.01)
*B60Q 1/14* (2006.01)
(52) U.S. Cl.
CPC .............. *G06T 9/00* (2013.01); *B60Q 1/0023* (2013.01); *B60Q 1/143* (2013.01); *B60Q 2400/40* (2013.01)

(58) Field of Classification Search
CPC ........ G06T 9/00; B60Q 1/0023; B60Q 1/143; H04N 1/40012; G06K 7/1469; G02F 2201/123
See application file for complete search history.

(56) References Cited

U.S. PATENT DOCUMENTS 6,061,475 A * 5/2000 Blair ....................... G06T 9/004
382/239
10,764,471 B1 * 9/2020 Wei ....................... H04N 1/6072
(Continued)

FOREIGN PATENT DOCUMENTS

DE 102008062640 A1 7/2009
WO 2020053718 A2 3/2020

OTHER PUBLICATIONS

IDoc: Switching off the device https://www.idoc.eu/guides/en/samsung/galaxy-a7/switching-off-the-device/s7155 (Year: 2018).*
(Continued)

*Primary Examiner* — Sumati Lefkowitz
*Assistant Examiner* — Wayne Zhang
(74) *Attorney, Agent, or Firm* — Valeo Vision

(57) ABSTRACT

The invention relates to a method for managing image data in an motor vehicle lighting system, the lighting system including at least one lighting module intended to project light beams generated on the basis of data relating to the selection of at least one image. The method including receiving an instruction to activate at least one image to be projected, converting the original image into N grey levels, determining, for each pixel in each row in the matrix, whether the pixel under analysis is a significant point of inflection, storing the pixel under analysis as a compressed pixel in a list when the pixel under analysis is considered to
(Continued)

be a significant point of inflection, and transmitting the list to the at least one lighting module so that it is able to project a resulting image.

13 Claims, 6 Drawing Sheets

(56)                    References Cited

U.S. PATENT DOCUMENTS

2007/0122009 A1*  5/2007  Jee ......................... G06V 40/16
                                                                382/118
2016/0243980 A1*  8/2016  El Idrissi ............. B60Q 1/1423
2020/0084854 A1*  3/2020  Bonne ................... H05B 45/10
2021/0256660 A1*  8/2021  Huang ................ G01S 7/52003

OTHER PUBLICATIONS

Computer Science Tutorials: Run-length encoding explained https://youtu.be/YI50cJScObl?si=kOip-5K2wut7aerF (Year: 2016).*
European Patent Office, International Search Report (with English translation) and Written Opinion of corresponding International Application No. PCT/EP2021/060609, dated Jul. 1, 2021.
Mark, J.W., et al., A Nonuniform Sampling Approach to Data Compression, IEEE Transactions o Communications, IEEE Service Center, Jan. 1, 1981, vol. 28, No. 1, pp. 24-32, NJ, USA.

* cited by examiner

100

110

125     120

124

| 10 | 25 | 100 | 150 | 180 | 200 | 245 | 250 | 252 | 253 | 253 | 253 | 252 | 250 | 245 | 200 | 180 | 150 | 100 | 25 | 10 |
| 15 | 30 | 115 | 170 | 190 | 210 | 250 | 252 | 253 | 255 | 255 | 255 | 253 | 252 | 250 | 210 | 190 | 170 | 115 | 30 | 15 |
| 15 | 30 | 115 | 170 | 190 | 210 | 250 | 252 | 253 | 255 | 255 | 255 | 253 | 252 | 250 | 210 | 190 | 170 | 115 | 30 | 15 |

METHOD FOR MANAGING IMAGE DATA, AND VEHICLE LIGHTING SYSTEM

CROSS-REFERENCE TO RELATED APPLICATIONS

This application is filed under 35 U.S.C. § 371 U.S. National Phase of International Application No. PCT/EP2021/060609 filed Apr. 22, 2021 (published as WO2021214263), which claims priority benefit to French Application No. 2004135 filed on Apr. 24, 2020, the disclosures of which are herein incorporated by reference in their entirety.

TECHNICAL FIELD

This invention relates to the field of vehicle lighting systems, and more particularly to managing image data for controlling light sources of a vehicle.

Modern lighting systems comprise in particular light sources that now make it possible to project a high-definition light beam. The desired projection of high-definition light may be obtained via the light sources and from images, or image patterns, that the sources receive in order to display them and thus project a given light beam. These images or image patterns are able to achieve very high resolutions now, in particular depending on the resolution of the light source that is used. By way of example, the light source may have at least 4000 to 30000 pixels, thus making it possible to generate a light beam from an image with this level of resolution.

BACKGROUND OF THE INVENTION

To succeed in generating such high-definition light beams, multiple light sources may be used, or even combined, which requires controlling them and finely synchronizing these sources in order to provide well-controlled, varied and adaptive lighting functionalities.

Vehicles therefore carry increasingly greater numbers of light sources, which use increasingly heavy high-definition image data, this involving a large amount of data that have to be managed by a vehicle control unit and communicated via a transmission means between the control unit and the one or more light sources. To do this, for example, a CAN protocol data bus is often used to transfer such data between the control unit and the light source. However, these data transmission means have the drawback of having a limited bandwidth, not allowing for example a bit rate of 2 to 5 Mbps to be exceeded in general. As a result, difficulties arise in transmitting the large amount of data required for said high-definition images over these limited networks. In addition, these networks are also used for the communication of other vehicle data, which means that the bandwidth available for high-definition image data may be even lower, for example limited to a range of 70 to 90% of the maximum bit rate possible over the data transmission network.

By way of example, to communicate high-definition image data for the projection of a lighting function with a resolution of 20000 pixels, the bit rate required over a CAN-FD transmission network would generally be 10 to 12 Mbps. However, such a CAN-FD network is currently actually limited to 5 Mbps (or even 2 Mbps in most cases). There is therefore a need to optimize the data transmitted over these networks, and in particular to compress the data that are communicated in order to transmit a stream of high-definition image data that is sufficient to ensure the one or more associated lighting functions, while observing the bit rate and bandwidth constraints of this same network.

BRIEF SUMMARY OF THE INVENTION

Known compression methods have been contemplated to overcome this problem, but they have all proven to be inadequate with respect to high-beam specificity, thereby hindering a sufficient reduction in the bandwidth as required by motor vehicle manufacturers.

To achieve this, provision could be made for multiple levels or iterations of data compression to be carried out, until succeeding in meeting a desired bandwidth. Still, such an approach has a very significant impact on the display quality of the projected lighting functions, since with each compression performed, display quality is affected; it is reduced.

However, for certain lighting functions, for example adaptive driving beams (ADBs) and road writing (RW), display quality cannot be overly degraded, as otherwise the user experience will be significantly lessened, with the light information projected by the light beam being made unclear, inadequate or even illegible.

There is therefore a need for a technical solution in order to overcome the abovementioned drawbacks.

The invention provides an at least partial solution to the technical problems highlighted above by way of a method for managing image data in a motor vehicle lighting system, said lighting system comprising at least one lighting module intended to project light beams, said light beams being generated from data relating to the selection of at least one original image, each original image being respectively defined by a matrix comprising a plurality of horizontal and/or vertical rows of pixels, wherein each pixel is characterized by a numerical value V[i] related to a light intensity of said pixel, said method comprising the following steps:

receiving an instruction to activate at least one original image intended to be projected;

converting the original image into N grayscale levels, where each grayscale level corresponds to a threshold ranging respectively from a first grayscale level threshold to the last grayscale level threshold;

from the first row to the last row of the matrix, sequentially carrying out the following steps, from the first pixel to the last pixel of the row under analysis:

if the numerical intensity value V[i] of a pixel under analysis is close to or equal to at least one of the thresholds ranging respectively from the first threshold to the last threshold, then the pixel under analysis is considered to be a significant point of inflection of a curve relating to the row under analysis and is saved as a compressed pixel in a list to be transmitted, otherwise the pixel under analysis is not saved in this list;

the previous step is reiterated until the last pixel of the last row of the matrix; and in that the list of compressed pixels of the matrix is transmitted to at least one lighting module so that it is able to project a resulting image.

Advantageously, in one embodiment, when the numerical value V[i] of a compressed pixel and the numerical value V[i+1] of an adjacent compressed pixel are respectively close to one and the same grayscale level threshold, then a pixel is sought between this set of compressed pixels, said sought pixel comprising a maximum numerical value V[iMax] or minimum numerical value V[iMin] so as to serve as a significant point of inflection of the pixel curve, said sought pixel being saved in the list of compressed pixels.

Advantageously, in another embodiment, when the numerical value of V[i+1] of the adjacent pixel with respect to the numerical value V[i] of the pixel under analysis is greater than at least two successive grayscale level thresholds, then these pixels are saved in the list of compressed pixels.

Advantageously, in another embodiment, when the numerical value V[i] of the pixel under analysis and the value V[i+1] of the adjacent pixel are successively equal to 0, then the value of i is incremented, and then this step is reiterated until the numerical value V[i+1] of the adjacent pixel is other than 0, then the first and the last pixel that had a value V[i] equal to 0 are saved in the list of compressed pixels.

Advantageously, in another embodiment, from the first compressed pixel to the last compressed pixel of the list of compressed pixels:

calculating a gradient value as a function of the numerical value V[i] of the compressed pixel and of the numerical value V[i+1] of the adjacent compressed pixel;

determining whether the compressed pixel under analysis is a significant point of inflection of a curve relating to the list of compressed pixels;

when the compressed pixel under analysis is considered to be a significant point of inflection of the curve, then the compressed pixel under analysis is retained in the list of compressed pixels to be transmitted, otherwise said compressed pixel is removed from the list.

Advantageously, in another embodiment, the matrix corresponding to the original image, to be used prior to any compression step, results from a selection of Y rows following a given recurrence T from among all of the rows D, with T corresponding to an integer less than D, and Y=D/T.

Advantageously, in another embodiment:

T=2, or

T=3, or

T=4.

According to one embodiment, the original image (I[x]) is selected from among a set of:

photometries, such as LB, or HB, or OFF, or LB and DBL, or HB and DBL;

lighting functions, such as ADB, and/or TSAG, and/or RW, and/or LA, and/or LA_Center.

According to one embodiment, a step of decompressing the list of compressed pixels received at the lighting modules is performed:

by way of a linear interpolation of the sub-intervals between the significant points of inflection of the curve formed by the list of compressed pixels, or by way of a polynomial interpolation of the sub-intervals between the significant points of inflection of the curve formed by the list of compressed pixels, or by way of an interpolation, using the Bézier curve method, of the sub-intervals between the significant points of inflection of the curve formed by the list of compressed pixels, or by way of an interpolation, using the parametric adaptation method, of the sub-intervals between the significant points of inflection of the curve formed by the list of compressed pixels, or by way of an interpolation, using the least squares method, of the sub-intervals between the significant points of inflection of the curve formed by the list of compressed pixels, or by way of an interpolation, using the exponential modeling method, of the sub-intervals between the significant points of inflection of the curve formed by the list of compressed pixels, or by way of an interpolation, using the Fourier series method, of the sub-intervals between the significant points of inflection of the curve formed by the list of compressed pixels, or by way of an interpolation, using the Gaussian modeling method, of the sub-intervals between the significant points of inflection of the curve formed by the list of compressed pixels, or by way of an interpolation, using the power series method, of the sub-intervals between the significant points of inflection of the curve formed by the list of compressed pixels, or by way of an interpolation, using the sums of sines models method, of the sub-intervals between the significant points of inflection of the curve formed by the list of compressed pixels, or by way of an interpolation, using the Weibull distribution method, of the sub-intervals between the significant points of inflection of the curve formed by the list of compressed pixels, by way of an interpolation, using the personalized models method, of the sub-intervals between the significant points of inflection of the curve formed by the list of compressed pixels.

In another embodiment, the compressed pixels are related only to a specific part of the original image.

According to a second aspect of the invention, the invention relates to a motor vehicle lighting system comprising:

at least one lighting module comprising a plurality of light sources able to project at least one photometry and/or lighting functions from compressed data, a multiplexed bus for transmitting compressed data to at least one lighting module, a control unit configured so as to implement all of the steps of the method according to any one of the preceding features.

In one embodiment, the lighting module furthermore comprises a control unit configured so as to be able to decompress the list of compressed pixels.

In another embodiment, the control unit of each lighting module comprises a memory that stores at least one Welcome and/or one Goodbye scenario.

According to another advantageous embodiment, at least one lighting module comprises at least one semiconductor light source, such as LEDs, and in particular a pixelated LED source.

In comparison with incandescent lighting, semiconductor lighting generates visible light with lower heat production and less energy dissipation. The generally low weight of a semiconductor electronic lighting device affords greater resistance to impacts and vibrations than brittle glass tubes/bulbs and long, thin filament wires. They are also not subject to filament evaporation, which may increase the service life of the lighting device. Some examples of these types of lighting comprise semiconductor light-emitting diodes (LEDs), organic light-emitting diodes (OLEDs), or polymer light-emitting diodes (PLEDs) as light sources instead of electrical filaments, plasma or gas.

Unless otherwise defined, all terms (including technical and scientific terms) used in this document should be interpreted in accordance with the standard practices of the profession. It is also understood that terms in common use are to be interpreted as customary in the relevant art and not in an idealized or overly formal sense, unless expressly defined as such herein.

BRIEF DESCRIPTION OF THE DRAWINGS

To supplement the description and to allow better understanding of the invention, a set of figures is provided. These figures form integral parts of the description and illustrate one embodiment of the invention, which should not be interpreted as limiting the scope of the invention, but merely as an example of how the invention may be carried out. The figures are as follows:

FIG. 4a, FIG. 4b and FIG. 4c respectively illustrate a curve representative of a row R[k] of a matrix M[x] as a function of N grayscale levels for which successive compression steps are carried out, according to one embodiment of the invention.

DETAILED DESCRIPTION OF THE INVENTION

Figures 1, 2:
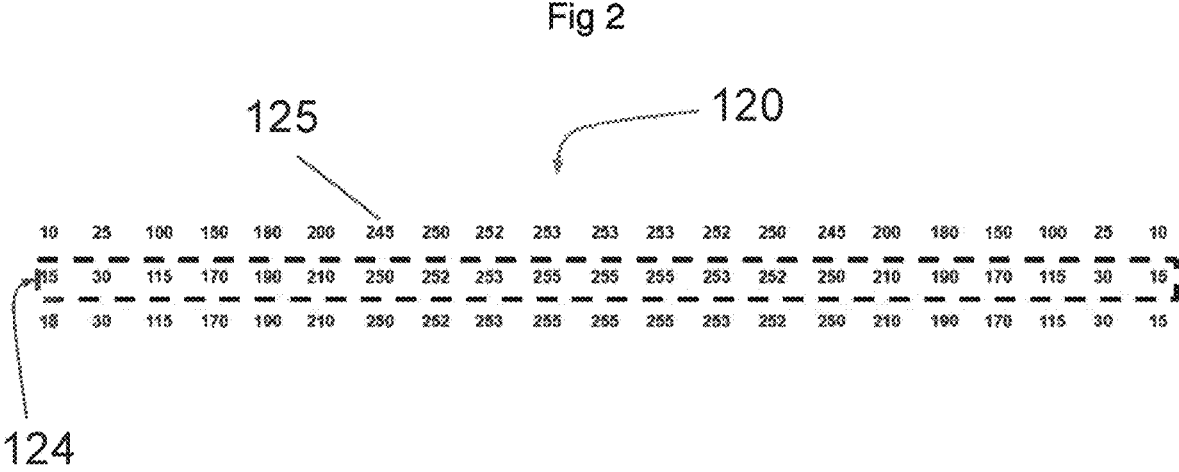
FIG. 1 illustrates a schematic depiction of an image relating to the photometry of a high beam, according to one embodiment of the invention.
FIG. 2 illustrates a partial matrix of pixels of the photometry according to FIG. 1, according to one embodiment of the invention.

In the remainder of the description, a set of abbreviations, references and/or numbers have been used, their definitions have been listed below for a better understanding of the figures, but certain references are not illustrated in order to lighten the figures, but are known to those skilled in the art:

SYS 200: Motor vehicle lighting system comprising at least one lighting module HL[z] 220, a multiplexed bus CAN 240, and a control unit PCM 230;

HL[z] 220: lighting module, essential component for the projection of light beams of the same resolution, z corresponding to the number of the module;

I[x] 100: original image relating to a set of non-exhaustive photometries and/or lighting functions of the type LB, HB 110, OFF, DBL, ADB, TSAG, RW, LA, LA_Center.

M[x] 120: corresponding to the matrix equivalent of the image I[x] 100.

LB: (low beam) photometry representative of a low beam;

HB 110: (high beam) photometry representative of a high beam;

OFF: photometry where the numerical value V[i] of all of the pixels P[i] 125 of the image I[x] 100 are at 0 or off;

DBL: (dynamic bending light) photometry that allows dynamic directional lighting, in other words a horizontal displacement of the maximum intensity of an LB or HB 110 photometry depending on the angle of rotation of the steering wheel of a motor vehicle;

ADB: (adaptive driving beam) function that allows lighting with a high-beam photometry while avoiding dazzling other road users;

TSAG: (traffic sign anti-glare) lighting function that makes it possible to avoid dazzling the traffic signs on a road following the projection of light beams from the motor vehicle;

RW: (road writing) lighting function that allows the projection, onto the road, of patterns visible to the driver and/or to road users;

LA: (line assist) lighting function that allows the projection of line-type patterns onto the road, in particular to delimit a portion of road to be taken by the motor vehicle or to present an obstacle avoidance strategy;

LA_Center: is a variant of LA, except that it is projected at the center of the road, in particular to indicate a direction of the vehicle.

P[i] 125: Pixel of the image 100, where i is a variable ranging from an initial value 1 to a final value F;

V[i]: Numerical value of the pixel P[i] 125, where i is a variable ranging from an initial value 1 to a final value F;

G[i]: Value of the gradient of P[i] 125

R[k] 124: k-th rows of the image I[x] 100 or I[y], where k is a variable ranging from an initial value 1 to a last value D;

C_R[k]: Curve relating to the k-th row R[k] 124;

PIS[i]: Significant point of inflection of a curve, the point where a change in concavity of the curve takes place, the PIS[i] is considered to be a pixel intended to be compressed, where i is a variable ranging from an initial value 1 to a final value F;

C_PIS[i]: curve relating to all of the compressed pixels PIS[i] of the list LPIS[i];

LPIS[i]: list of compressed pixels PIS[i];

PCM 230: (pixel controller module), a control unit intended to drive a set of pixels of lighting modules via a control unit UC[z] 210;

CAN 240 or CAN-FD: multiplexed communication bus variants;

UC[z] 210: Control unit, also called driver, intended to control a lighting module. Each control unit UC[z] 210 interacts as a "slave" with respect to the control unit PCM 230, which is considered to be a "master".

The exemplary embodiments are described in sufficient detail to allow those of ordinary skill in this art to be able to implement the systems and processes described below. It is important to understand that the embodiments may be provided in a number of alternative forms and should not be construed as being limited to the examples presented below.

Consequently, although an embodiment may be modified in various ways and take various alternative forms, specific embodiments thereof are shown in the drawings and described in detail below by way of example. No limitation to the particular forms disclosed is intended. Rather, all modifications, equivalents and alternatives falling within the scope of the appended claims are to be included.

FIG. 1 illustrates a schematic depiction of an image I[x] 100, referred to as original image, relating to an HB 110 (high beam) photometry.

According to the invention, each image I[x] 100 has its equivalent in the form of a matrix M[x] 120 comprising a plurality of horizontal or vertical rows R[k] 124 of pixels P[i] 125, each pixel P[i] 125 being characterized by a numerical value V[i] related to a light intensity. In one embodiment of the invention, the numerical value V[i] extends over a scale ranging from 0, corresponding to black, up to 255, corresponding to white. FIG. 2 illustrates one embodiment relating to a partial matrix M[x] 120 of pixels P[i] 125 with a photometry corresponding to the high beams HB 110 according to FIG. 1.

Nowadays, a modern motor vehicle has a control unit, commonly called PCM 230 (for pixel controller module), intended to drive a set of pixels of lighting modules HL[z] 220 via a control unit UC[z] 210, where the variable z ranging from 1 to n corresponds to the number assigned to the lighting module HL[z] 220. The control unit PCM 230 and each control unit UC[z] 210 comprises, respectively and in a non-exhaustive manner, at least one microprocessor PRO and a memory MEM configured so as to allow the implementation of a method for managing image data in a motor vehicle lighting system SYS 200 according to the invention.

The control unit PCM 230 is configured such that, depending on data collected from a set of sensors distributed in the motor vehicle and on the environmental context in which said vehicle is moving, said control unit PCM 230 is capable of deciding, in complete autonomy or under the impulse of a driver, or on the behavior of said driver on the road, to activate or deactivate at least one regulatory LB, HB 110, OFF, DBL photometry and/or ADB, TSAG, RW, LA, LA_Center lighting function. In the context of this invention, the two concepts of photometry and lighting function are distinct. Indeed, it will be considered, in a non-exhaustive list, that the term photometry encompasses an image I[x] 100, with x ranging from 1 to 4, where:

I[1] comprises an equivalent matrix M[1] corresponding to a high beam HB 110;

I[2] comprises an equivalent matrix M[2] corresponding to a low beam LB;

I[3] comprises an equivalent matrix M[3] where all of the pixels have a numerical value V[i] of 0, in other words all of the pixels P[i] 125 are off, with i ranging from 1 to F;

I[4] comprises an equivalent matrix M[4] corresponding to a dynamic bending light DBL.

Likewise, it will be considered, in a non-exhaustive list, that the term lighting function encompasses an image I[x] 100, with x ranging from 5 to 9, where:

I[5] comprises an equivalent matrix M[5] corresponding to an ADB (adaptive driving beam) function that allows lighting with an LB, HB 110 or DBL photometry while avoiding dazzling other road users;

I[6] comprises an equivalent matrix M[6] corresponding to a TSAG (traffic sign anti-glare) function that makes it possible to avoid dazzling the traffic signs on a road following the projection of light beams from the motor vehicle;

I[7] comprises an equivalent matrix M[7] corresponding to an RW (road writing) function that allows the projection, onto the road, of patterns visible to the driver and/or to road users;

I[8] comprises an equivalent matrix M[8] corresponding to an LA (line assist) function that allows the projection of line-type patterns onto the road with or without a sensation of the lines scrolling, so as to delimit a portion of road to be taken by the motor vehicle or to project an obstacle avoidance strategy;

I[9] comprises an equivalent matrix M[9] corresponding to an LA_Center function, which is a variant of the LA function, except that it is projected at the center of the road, in particular to indicate a direction of the vehicle.

The invention is in no way limited to just the photometries and lighting functions mentioned above, and it goes without saying that images relating to a Welcome and/or Goodbye scenario, and/or other photometries and/or lighting functions specific to the regulations of a country or region of the world could be added or updated.

According to the invention, a database comprising a set of matrices M[x] 120 of photometries and lighting functions possible on a road, in particular depending on the respective regulations, is recorded in the memory of the control unit PCM 230. The control unit PCM 230, following the reception of an instruction from the driver or on its own initiative with regard to the environmental context of the motor vehicle, activates the projection of at least one image I[x] 100 intended to be projected. The corresponding matrix M[x] 120 is then selected from the database saved in the memory of the control unit PCM 230.

Figure 3:
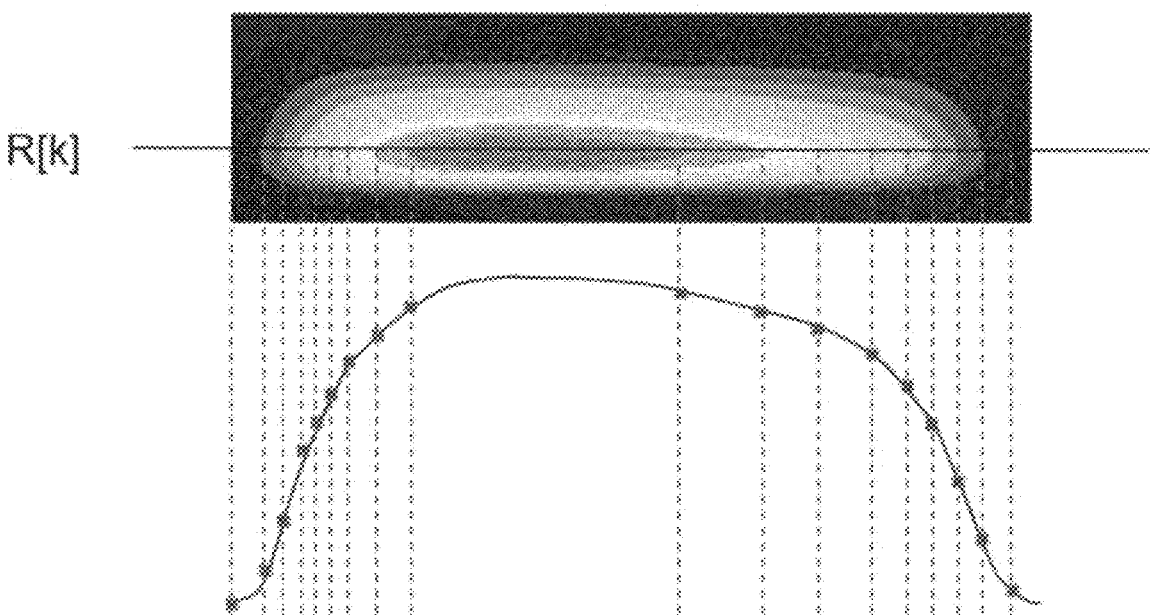
FIG. 3 illustrates a quantization, in N grayscale levels, of the photometry according to FIG. 1, according to one embodiment of the invention.
Figure 4A:
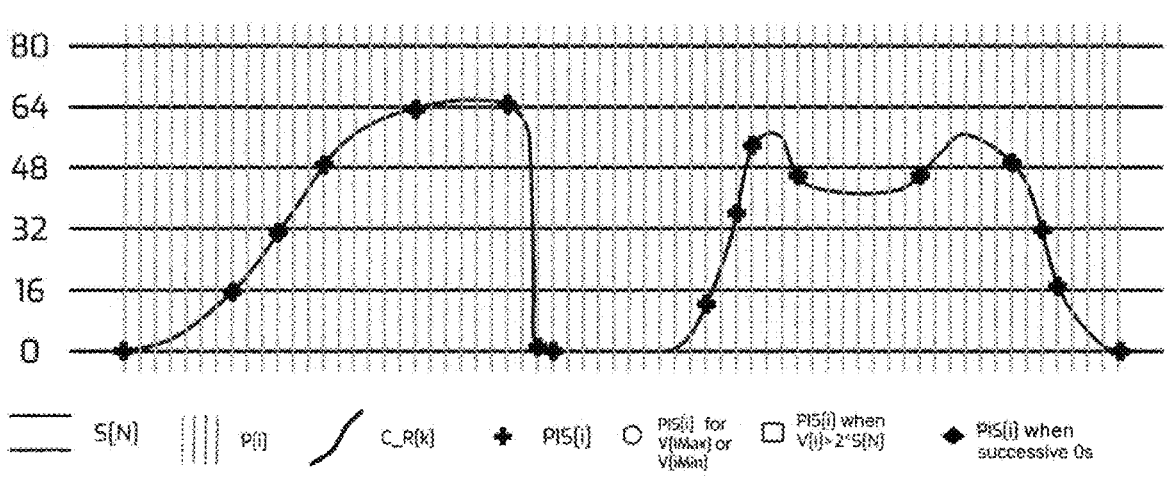

According to FIG. 3, the selected image I[x] 100 is converted into N grayscale levels, where each grayscale level corresponds to a threshold ranging respectively from a first grayscale level threshold S[1] to the last grayscale level threshold S[N]. According to FIG. 4a, from the first row R[1] to the last row R[D] of the matrix M[x] 120, the control unit sequentially carries out the following steps, from the first pixel P[1] to the last pixel P[F] of the row R[k] 124:

if the numerical intensity value V[i] of a pixel P[i] 125 under analysis is close to or equal to at least one of the thresholds ranging respectively from S[1] to S[N], then the pixel P[i] 125 under analysis is considered to be a significant point of inflection of a curve C_R[k] relating to the row R[k] 124 and is saved as a compressed pixel PIS[i] in a list LPIS[i] to be transmitted, otherwise the pixel P[i] 125 under analysis is not saved;

the control unit PCM 230 reiterates the previous step until the last pixel P[F] of the last row R[D] of the matrix M[x] 120.

In a first embodiment of the invention, the list LPIS[i] of compressed pixels PIS[i] of the matrix M[x] 120 is transmitted to at least one lighting module HL[z] 220 so that it is able to project a resulting image Ir[x] 250.

Figure 4B:
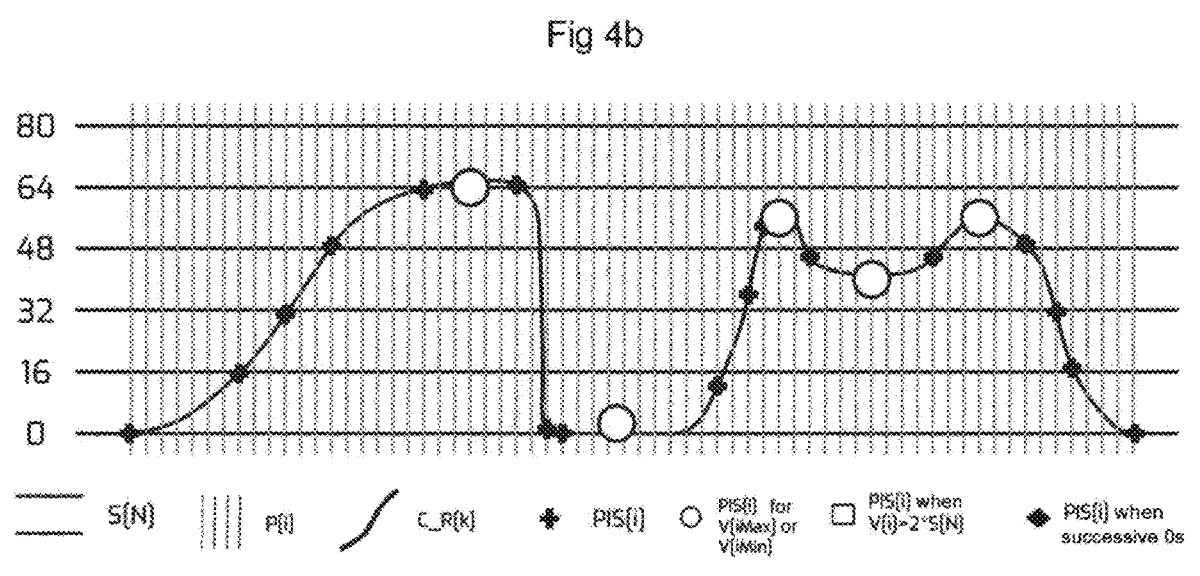

In order to improve the error rate, in one illustrated embodiment FIG. 4b, the invention makes provision that, when the numerical value V[i] of a compressed pixel PIS[i] and the numerical value V[i+1] of an adjacent compressed pixel PIS[i+1] are respectively close to one and the same threshold S[1], . . . , S[N], then a pixel P[i] 125 is sought between this set of compressed pixels PIS[i] and PIS[i+1], said sought pixel P[i] 125 comprising a maximum numerical value V[iMax] or minimum numerical value V[iMin], so as to serve as a significant point of inflection of the curve C_R[k]. The sought pixel P[i] 125 is then saved in the list LPIS[i] of compressed pixels PIS[i].

Figure 4C:
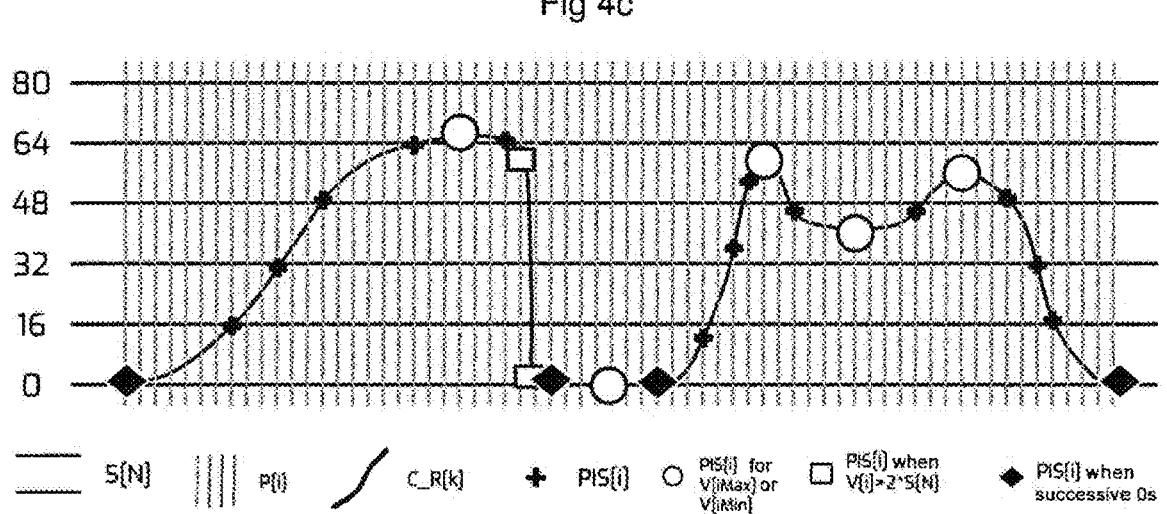

In order to improve the compression rate, in one embodiment according to FIG. 4c, when the numerical value of V[i+1] of the adjacent pixel P[i+1] with respect to the numerical value V[i] of the pixel P[i] 125 under analysis is greater than at least two successive thresholds S[1], . . . , S[N], then these pixels P[i] 125, P[i+1] are saved in the list LPIS[i] of compressed pixels PIS[i].

Still with the aim of improving the compression rate, in one embodiment illustrated in FIG. 4c, when the numerical value V[i] of the pixel P[i] 125 under analysis and the value V[i+1] of the adjacent pixel P[i+1] are successively equal to 0, then the value of i is incremented, and then this step is reiterated until the numerical value V[i+1] of the adjacent pixel P[i+1] is other than 0, then the first and the last pixel P[i] 125 that had a value V[i] equal to 0 are saved in the list LPIS[i] of compressed pixels PIS[i].

In order to further improve the compression rate, in one embodiment of the invention, from the first compressed pixel PIS[1] to the last compressed pixel PIS[F] of the list LPIS[i] of compressed pixels PIS[i]:

the control unit calculates a gradient value G[i] as a function of the numerical value V[i] of the compressed pixel PIS[i] and of the numerical value V[i+1] of the adjacent compressed pixel PIS[i+1]. Such calculation of the gradient G[i] is performed as follows: G[i]=V [i+1]−V[i], with i ranging from 1 to F;

the control unit determines whether the compressed pixel PIS[i] under analysis is a significant point of inflection of a curve C_PIS[i] relating to the list LPIS[i] of compressed pixels PIS[i]. For this purpose, the control unit PCM 230:

determines a value E_Max_V[i] corresponding to the maximum tolerated difference between the value V[i] of the compressed pixel PIS[i] under analysis of the curve C_PIS[i] and the value V[i] of the compressed pixel PIS[i].

when the compressed pixel PIS[i] under analysis is considered to be a significant point of inflection of the curve C_PIS[i], then the compressed pixel PIS[i] under analysis is retained in the list LPIS[i] of compressed pixels to be transmitted to the lighting module HL[z] 220, otherwise said compressed pixel PIS[i] is removed from the list LPIS[i].

To drastically improve the compression rate, in one embodiment of the invention, prior to any compression step, a preliminary step makes provision for a selection of Y rows R[k] 124 of the matrix M[x] 120 following a given recurrence T, between the first row R[1] to the last row R[D]. It is considered that the recurrence T corresponds to an integer less than D total number of rows R[k] 124, and that Y=D/T. In one example, T=2, or T=3, or T=4. A matrix M[Y] corresponding to the Y rows selected following the recurrence T will thus be used instead of the matrix M[x] 120 to implement the various abovementioned compression algorithms, thereby reducing the number of pixels to be compressed and at the same time reducing the computing times of the microprocessor PRO.

Figure 5:
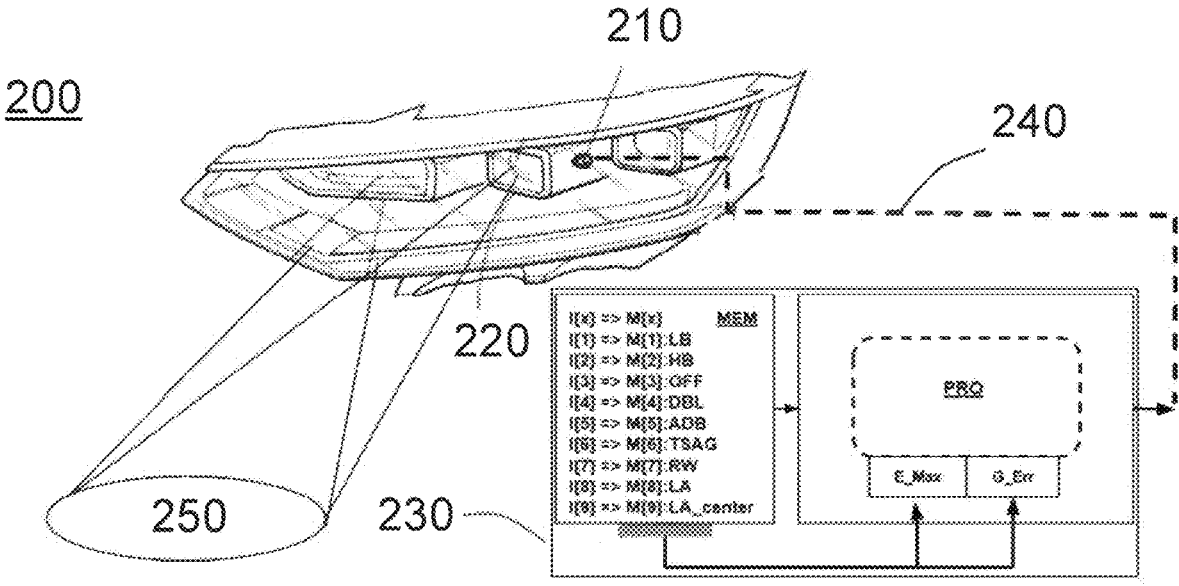
FIG. 5 illustrates a motor vehicle lighting system according to the invention.

FIG. 5 shows a motor vehicle lighting system SYS 200 according to the invention, comprising:

at least one lighting module HL[z] 220 comprising a plurality of light sources, such as LEDs, capable of projecting photometries and/or lighting functions from compressed data LPIS[i];

a multiplexed CAN 240, CAN-FD bus or the like, for transmitting compressed data LPIS[i] to at least one lighting module HL[z] 220;

a control unit PCM 230 intended to implement all of the abovementioned compression steps, so as to generate compressed data PIS[i];

a control unit UC[z] 210 configured to decompress the compressed data, this control unit UC[z] 210 being located in the lighting module HL[z] 220.

Such a step of decompressing the list of compressed pixels received via the CAN 240 at the lighting modules HL[z] 220 is performed by way of:

a linear interpolation of the sub-intervals between the significant points of inflection of the curve formed by the list of compressed pixels, or a polynomial interpolation of the sub-intervals between the significant points of inflection of the curve formed by the list of compressed pixels, or an interpolation, using the Bézier curve method, of the sub-intervals between the significant points of inflection of the curve formed by the list of compressed pixels, or an interpolation, using the parametric adaptation method, of the sub-intervals between the significant points of inflection of the curve formed by the list of compressed pixels, or an interpolation, using the least squares method, of the sub-intervals between the significant points of inflection of the curve formed by the list of compressed pixels, or an interpolation, using the exponential modeling method, of the sub-intervals between the significant points of inflection of the curve formed by the list of compressed pixels, or an interpolation, using the Fourier series method, of the sub-intervals between the significant points of inflection of the curve formed by the list of compressed pixels, or an interpolation, using the Gaussian modeling method, of the sub-intervals between the significant points of inflection of the curve formed by the list of compressed pixels, or an interpolation, using the power series method, of the sub-intervals between the significant points of inflection of the curve formed by the list of compressed pixels, or an interpolation, using the sums of sines models method, of the sub-intervals between the significant points of inflection of the curve formed by the list of compressed pixels, or an interpolation, using the Weibull distribution method, of the sub-intervals between the significant points of inflection of the curve formed by the list of compressed pixels, an interpolation, using the personalized models method, of the sub-intervals between the significant points of inflection of the curve formed by the list of compressed pixels.

Each lighting module HL[z] 220 makes it possible to obtain a projection of high beams or a resulting image Ir[x] 250 of a quality substantially identical to the original image I[x] 100, having used a method that allows a compression rate close to or greater than 90%.

What is claimed is:

1. A method for managing image data in a motor vehicle lighting system, the lighting system including at least one lighting module intended to project light beams, the light beams being generated from data relating to the selection of at least one image, each image being respectively defined by a matrix including a plurality of horizontal or vertical rows of pixels, with each pixel being characterized by a numerical value related to a light intensity of the pixel, the method comprising:

receiving an instruction to activate at least one image intended to be projected;

converting the original image into N grayscale levels, where each grayscale level corresponds to a threshold ranging respectively from a first grayscale level threshold to the last grayscale level threshold;

determining, for each pixel in each row in the matrix, whether the pixel is a significant point of inflection of a curve relating to the row, based on whether a numerical intensity value of a pixel, with the pixel being a significant point of inflection if the numerical intensity value is close to or equal to at least one of the thresholds ranging respectively from a first grayscale level threshold to the last grayscale level threshold;

storing the pixel as a compressed pixel in a list of compressed pixels when the pixel is considered to be a significant point of inflection;

determining a sought pixel by analyzing the numerical value of a compressed pixel and the numerical value of an adjacent compressed pixel to determine if the numerical values of the compressed pixel and the adjacent compressed pixel are respectively close to a same threshold, then the sought pixel is determined between the compressed pixel and the adjacent compressed pixel, the sought pixel includes a maximum numerical value or minimum numerical value on the curve between the compressed pixel and the adjacent compressed pixel thus letting the sought pixel serve as a significant point of inflection of the curve and is saved in the list of compressed pixels; and transmitting the list of compressed pixels to the at least one lighting module so that the at least one lighting module is able to project a resulting image.

2. The method as claimed in claim 1, furthermore when the numerical value of an adjacent pixel with respect to the numerical value of the pixel is greater than at least two successive thresholds, then these pixels are saved in the list of compressed pixels.

3. The method as claimed in claim 1, furthermore when the numerical value of the pixel and the numerical value of an initial adjacent pixel are successively equal to 0, then a different adjacent pixel is selected that has a numerical value that is other than 0, then a first and a last pixel that had a value equal to 0 are saved in the list of compressed pixels.

4. The method as claimed in claim 1, further comprising:

calculating a gradient value as a function of the numerical value of the compressed pixel and of the numerical value of the adjacent compressed pixel;

determining whether the compressed pixel is a significant point of inflection of a curve relating to the list of compressed pixels; and when the compressed pixel is considered to be a significant point of inflection of the curve relating to the list of compressed pixels, then the compressed pixel is retained in the list of compressed pixels, otherwise the compressed pixel is removed from the list of compressed pixels.

5. The method as claimed in claim 1, wherein the matrix, corresponding to the resulting image, results from a selection of rows following a given recurrence from among all of the rows, with the given recurrence corresponding to an integer less than all of the rows, and the selection of rows equals all of the rows divided by the given recurrence.

6. The method as claimed in claim 5, wherein the given recurrence equals 2 or 3 or 4.

7. The method as claimed in claim 1, wherein the resulting image is selected from among a set of:

photometries including low beam (LB), or high beam (HB), or OFF, or LB and dynamic bending light (DBL), or HB and DBL; and lighting functions including one or more of adaptive driving beam (ADB), traffic sign anti-glare (TSAG), road writing (RW), line assist (LA), and line assist center (LA_Center).

8. The method as claimed in claim 1, further comprising decompressing the list of compressed pixels at the at least one lighting module by one of the following processes:

by way of a linear interpolation of sub-intervals between the significant points of inflection of the curve formed by the list of compressed pixels, or by way of a polynomial interpolation of sub-intervals between the significant points of inflection of the curve formed by the list of compressed pixels, or by way of an interpolation, using a Bézier curve method, of the sub-intervals between the significant points of inflection of the curve formed by the list of compressed pixels, or by way of an interpolation, using a parametric adaptation method, of the sub-intervals between the significant points of inflection of the curve formed by the list of compressed pixels, or by way of an interpolation, using a least squares method, of the sub-intervals between the significant points of inflection of the curve formed by the list of compressed pixels, or by way of an interpolation, using a exponential modeling method, of the sub-intervals between the significant points of inflection of the curve formed by the list of compressed pixels, or by way of an interpolation, using a Fourier series method, of the sub-intervals between the significant points of inflection of the curve formed by the list of compressed pixels, or by way of an interpolation, using a Gaussian modeling method, of the sub-intervals between the significant points of inflection of the curve formed by the list of compressed pixels, or by way of an interpolation, using a power series method, of the sub-intervals between the significant points of inflection of the curve formed by the list of compressed pixels, or by way of an interpolation, using a sums of sines models method, of the sub-intervals between the significant points of inflection of the curve formed by the list of compressed pixels, or by way of an interpolation, using a Weibull distribution method, of the sub-intervals between the significant points of inflection of the curve formed by the list of compressed pixels, or by way of an interpolation, using a personalized models method, of the sub-intervals between the significant points of inflection of the curve formed by the list of compressed pixels.

9. The method as claimed in claim 1, wherein the compressed pixel is related only to a specific part of the image.

10. A motor vehicle lighting system comprising:

at least one lighting module comprising a plurality of light sources able to project lighting functions from a compressed data list, a multiplexed bus for transmitting a compressed data list to at least one lighting module, and a control unit configured to:

receive an instruction to activate at least one image intended to be projected;

convert the original image into N grayscale levels, where each grayscale level corresponds to a threshold ranging respectively from a first grayscale level threshold to the last grayscale level threshold;

determine, for each pixel in each row in the matrix, whether the pixel is a significant point of inflection of a curve relating to the row, based on whether a numerical intensity value of the pixel, with the pixel being a significant point of inflection if the numerical intensity value is close to or equal to at least one of the thresholds ranging respectively from a first grayscale level threshold to the last grayscale level threshold;

store the pixel as a compressed pixel in a list when the pixel is considered to be a significant point of inflection;

determine a sought pixel by analyzing the numerical value of a compressed pixel and the numerical value of an adjacent compressed pixel to determine if the numerical values of the compressed pixel and the adjacent compressed pixel are respectively close to a same threshold, then the sought pixel is determined between the compressed pixel and the adjacent compressed pixel, the sought pixel includes a maximum numerical value or minimum numerical value on the curve between the compressed pixel and the adjacent compressed pixel thus letting the sought pixel serve as a significant point of inflection of the curve and is saved in the list of compressed pixels; and transmit the list to the at least one lighting module so that the at least one lighting module is able to project a resulting image.

11. The motor vehicle lighting system as claimed in claim 10, wherein the lighting module further includes a lighting control unit configured to decompress the compressed datalist.

12. The motor vehicle lighting system as claimed in claim 11, wherein the lighting control unit includes a memory that stores at least one Welcome and at least one Goodbye scenario.

13. The motor vehicle lighting system as claimed in claim 11, wherein the lighting control unit includes a memory that stores at least one Welcome or one Goodbye scenario.

* * * * *